United States Patent [19]

Katsumoto et al.

[11] Patent Number: 4,850,317
[45] Date of Patent: Jul. 25, 1989

[54] INTAKE PORT DEVICE

[75] Inventors: Takehiko Katsumoto; Yoshiaki Danno; Daisuke Sanbayashi; Takashi Dogahara; Katsuo Akishino; Osamu Hirako; Nobuaki Murakami, all of Kyoto, Japan

[73] Assignee: Mitsubishi Jidosha Kogyo Kabushiki Kaisha, Tokyo, Japan

[21] Appl. No.: 163,963

[22] PCT Filed: Apr. 1, 1987

[86] PCT No.: PCT/JP87/00202
§ 371 Date: Dec. 17, 1987
§ 102(e) Date: Dec. 17, 1987

[87] PCT Pub. No.: WO87/05965
PCT Pub. Date: Oct. 8, 1987

Related U.S. Application Data

[63] Continuation-in-part of Ser. No. 40,855, Apr. 21, 1987, Pat. No. 4,765,294.

[30] Foreign Application Priority Data

Apr. 2, 1986 [JP] Japan .............. 61-49482[U]
May 26, 1986 [JP] Japan .............. 61-78073[U]

[51] Int. Cl.$^4$ .............................................. F22B 5/02
[52] U.S. Cl. ............................ 123/306; 123/188 M
[58] Field of Search .................. 123/306, 188 M, 308, 123/442

[56] References Cited

U.S. PATENT DOCUMENTS 4,240,387 12/1980 Motosugi ............... 123/188 M
4,470,386 9/1984 Okumura ............... 123/306
4,481,922 11/1984 Sugiura ............... 123/306

FOREIGN PATENT DOCUMENTS 58-126428 7/1973 Japan ............... 123/306
56-142227 10/1981 Japan .
57-212330 12/1982 Japan .
61-5540 2/1986 Japan ............... 123/306

Primary Examiner—E. Rollins Cross
Attorney, Agent, or Firm—Abelman Frayne Rezac & Schwab

[57] ABSTRACT

An intake port device comprises an intake port (9) formed by a straight part (13) and a helical part (15), and a valve (17) disposed adjacent to the inlet of the intake port. In order that intake air flow having a large swirl ratio can be supplied to an engine without being encountered with a large resistance even in a light-loaded condition of the engine, the valve (17) is held in its closed position without causing any sharp decrease in the coefficient of intake air flow when closed. In a modification of the intake port device, the valve (17) holds open the lower half of the intake port 9 in its closed position, so that intake air flow having a large swirl ratio can be supplied without being encounted with a large resistance even when the load of the engine is light. In another modification of the intake port device, the free end of the valve (17) is bent and deformed in the downstream direction of intake air so that the flow of intake air may not be encountered with a large resistance.

15 Claims, 11 Drawing Sheets

INTAKE PORT DEVICE

This is a CIP of 07/040,855 filed 04/21/87 now U.S. Pat. No. 4,765,294.

TECHNICAL FIELD

This invention relates to an intake port device for an internal combustion engine in which an intake port having a special shape is combined with a valve so that the direction of intake air flowing into a combustion chamber of the engine can be changed according to the load of the engine.

BACKGROUND ART

It is desirable that air taken into a combustion chamber of an internal combustion engine is suitably swirled in order to promote mixing of air with fuel. This swirl is commonly provided by giving directivity to intake air by an intake port formed into a helical shape. When the load of the engine is light, a swirl is produced to promote mixing of intake air with fuel thereby improving the combustion efficiency. However, when the engine is heavy-loaded, and suction of a large quantity of intake air is required, a large resistance against intake air is caused by the helical shape of the intake port, resulting in a decrease in the charging efficiency. With a view to obviate such a drawback, a partition wall or a separate port is commonly provided in the intake port according to the prior art, and an associated valve is provided so as to change the magnitude of the swirl.

In the prior art device described above, the provision of the partition wall or the separate port in the intake port or the additional provision of the valve results in a complex structure of the intake port and is undesirable from the viewpoints of operation, manufacture and cost.

When the valve provided in the intake port is full closed, such a trouble has occurred in which the inclination angle of the valve relative to the centerline of the intake port becomes large thereby producing a large resistance against flow of intake air. To avoid such a trouble, an attempt is made in which the length of the valve from its root end to its front end is extended to decrease the inclination angle of the valve when closed. When such a valve is used, the resistance against intake air flow can be decreased to decrease the loss of energy. However, the use of the valve having such a large length gives rise to the defect that the shape of the intake port is subject to various design restrictions, and the force required for actuating the valve becomes also large resulting in a large loss of power for driving the valve, although the loss of energy of intake air flow is decreased. In order that the swirl can be produced regardless of the shape of the intake port, the valve may be arranged to be inserted into and withdrawn from the interior of the intake port. However, even when such a withdrawable valve is used, the defect attributable to the increased resistance against intake air flow is not still obviated although the shape of the intake port is now free from various design restrictions.

DISCLOSURE OF THE INVENTION

In view of the prior art situations described above, it is an object of the present invention to provide an intake port device in which an intake port formed into a special shape is provided without provision of any partition wall or the like, and a valve, which produces a very small resistance against intake air flow and the design of which is not limited by the shape of the intake port, is disposed on the inlet side of the intake ports and regulated to provide flow of air having a quantity and shape corresponding to the load of the engine, so that the manufacture of the intake port can be facilitated, its cost can be reduced, and its performance under a heavy-loaded condition can be improved.

An intake port device of the present invention is featured by the provision of an intake pot providing a passage of intake air flowing into a combustion chamber of a cylinder of an internal combustion engine, the intake port including a straight part forming an upper half of the intake port with respect to the axial direction of the cylinder and a helical part formed integrally with the straight part without provision of any partition wall therebetween to form a lower half of the intake port with respect to the axial direction of the cylinder, the helical part having a swirl chamber of helical configuration surrounding an intake valve, value means disposed adjacent to the inlet of the intake port to open and close the sectional area of the passage in the intake port, the valve means, when urged to its closed position, being held in the closed position without causing any sharp decrease in the coefficient of intake air flow, and an opening/closing mechanism for controlling opening and closing of the valve means according to the load of the engine. Therefore, the intake port is of the structure in which its straight part and its helical part are integrally formed, and a valve is disposed at an upper position of the inlet of the intake port. The opening of this valve is suitably controlled so that, when the engine is light-loaded, the flow rate of intake air flowing into the helical part of the intake port is increased to induce a swirl in the intake air flowing into the combustion chamber, while when the engine is heavy-loaded, the flow rate of intake air flowing into the combustion chamber is secured by both the straight part and the helical part.

Another intake port device of the present invention is featured by the provision of an intake port providing a passage of intake air flowing into a combustion chamber of a cylinder of an internal combustion engine, the intake port including a straight part forming an upper half of the intake port with respect to the axial direction of the cylinder and a helical part formed integrally with the straight part without provision of any partition wall therebetween to form lower half of the intake port with respect to the axial direction of the cylinder, the helical part having a swirl chamber of helical configuration surrounding an intake valve, valve means disposed adjacent to the inlet of the intake port, the valve means, when urged to its closed position, holding open substantially the lower half of the sectional area of the passage in the intake port corresponding to an upstream extension of the helical part, and an opening/closing mechanism for controlling opening and closing of the valve means according to the load of the engine. Therefore, when the engine is, for example, light-loaded, the valve means is closed without causing any sharp change in the flow coefficient. The valve means acts to interrupt straightforward flow of intake ai into the combustion chamber and also acts to introduce flow of intake air into the swirl-inducing helical passage thereby supplying intake air flow having a large swirl ratio into the combustion chamber.

Another intake port device of the present invention is featured by the provision of an intake port providing a passage of intake air flowing into a combustion chamber of a cylinder of an internal combustion engine, the intake port including a straight part forming an upper half of the intake port with respect to the axial direction of the cylinder and a helical part formed integrally with the straight part without provision of any partition wall therebetween to form a lower half of the intake port with respect to the axial direction of the cylinder, the helical part having a swirl chamber of helical configuration surrounding an intake valve, valve means disposed adjacent to the inlet of the intake port to open and close the sectional area of the passage in the inlet port, the valve means having its free end bent and deformed in the downstream direction of intake air flow, and an opening/closing mechanism for controlling opening and closing of the valve means according to the load of the engine.

Therefore, even when the inclination of the valve means when closed makes a large angle with respect to the axis parallel to the flow of intake air, the free end of the valve means is inclined toward the downstream direction of the flow of intake air, so that the flow of intake air is not encountered with a large resistance.

BRIEF DESCRIPTION OF THE DRAWINGS

FIGS. 3 (a), (b) and (c) are a side elevation view, a plane view and a perspective view respectively showing the shape of the intake port of the intake port device according to the present invention.

FIGS. 17, 18(a), (b), (c), (d) and 19(a), (b), (c), (d) illustrate a fifth embodiment of the present invention showing another form of he opening/closing mechanism employed in the first embodiment.

BEST MODE FOR CARRYING OUT THE INVENTION

A first embodiment of the intake port device according to the present invention will now be described in detail with reference to the drawings.

Figure 1:
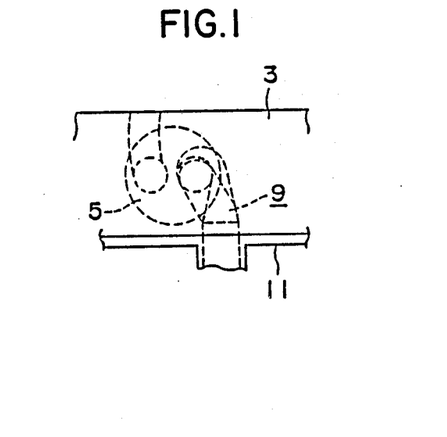
FIGS. 1 and 2 illustrate an intake port of an intake port device according to the present invention.
Figure 2:
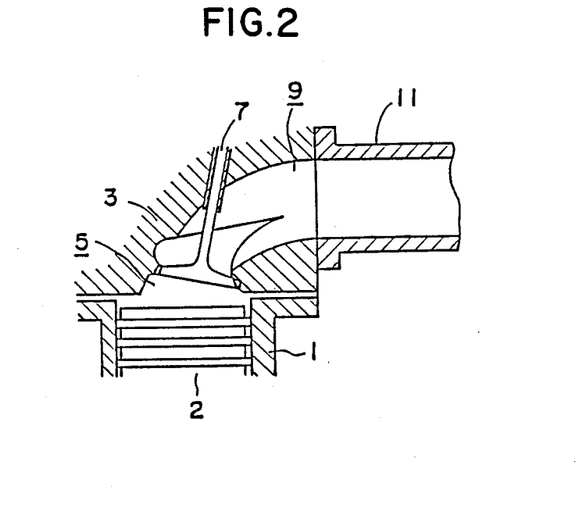

Referring to FIGS. 1 and 2, 1 is a cylinder block, 2 is a piston making a reciprocating movement in the cylinder block, 3 is a cylinder head fixedly mounted on the cylinder block 1, 5 is a combustion chamber formed between the piston 2 and the cylinder head 3, 7 is an intake valve, 9 is an intake port, and 11 is an intake manifold fixed to the intake port 9.

A spark plug (not shown) is disposed in the combustion chamber 5, and a throttle valve not shown) is disposed on the upstream side of the intake manifold 11 to control the quantity of intake air.

Figure 3A:
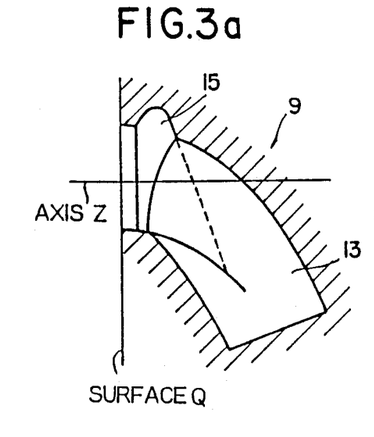
Figure 3B:
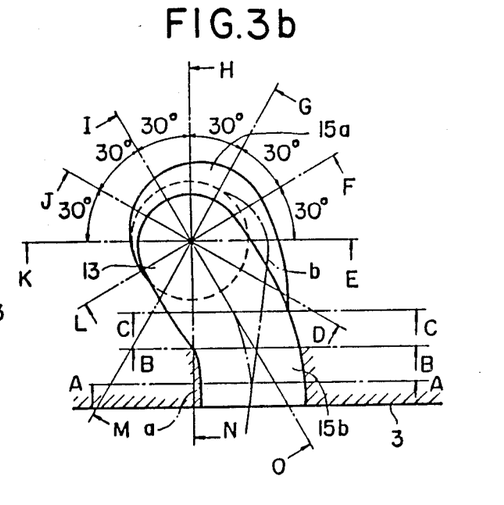
Figure 3C:
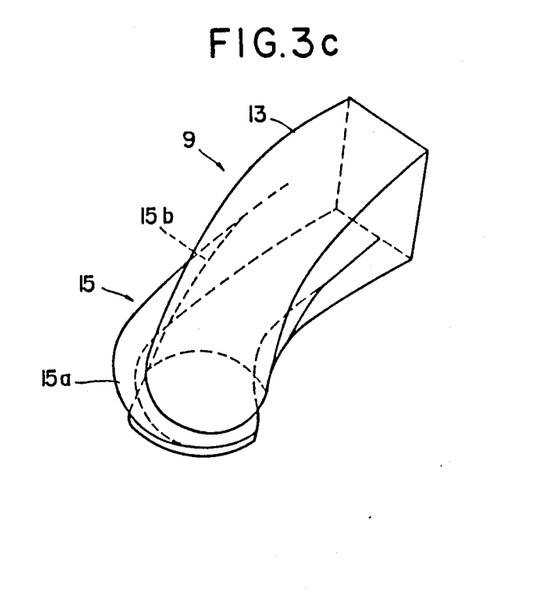
Figure 4A:
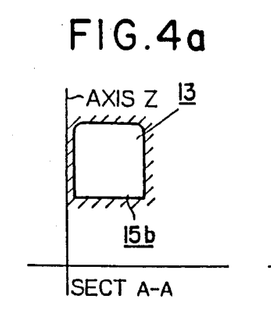
FIGS. 4(a), (b), (c), (d), (e), (f), (g), (h) and (i) are sectional views taken along the lines A-A, B-B, C-C, J-D, K-E, L-F, N-G, N-H, and O-1 in FIG. 3(b) respectively.
Figure 4B:
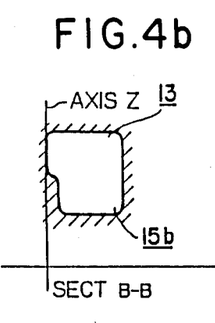
Figure 4C:
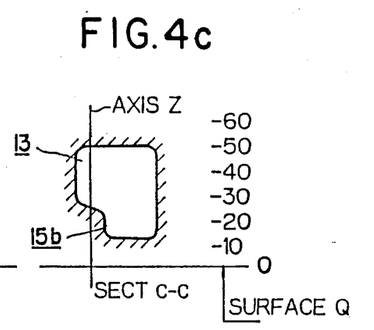
Figure 4D:
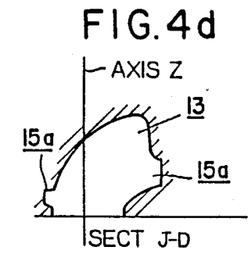
Figure 4E:
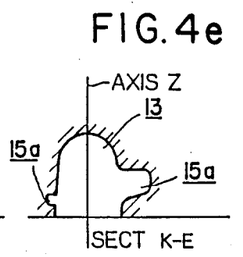
Figure 4F:
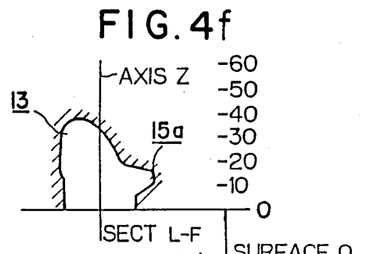
Figures 4G, 4H:
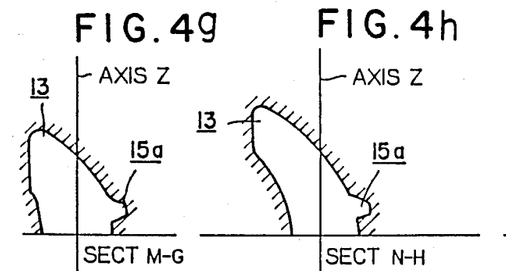
Figure 4I:
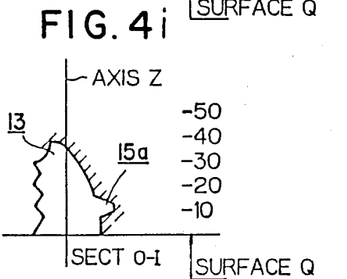

The shape of the intake port 9 is schematically shown in FIGS. 3(a), (b), (c) and FIGS. 4(a), (b), (c), (d), (e), (f), (g), (h), (i).

As shown in FIG. 3, the intake port 9 is composed of two parts integrally combined with each other, that is, a straight part 13 forming an upper half of the intake port 9, and a helical part 15 forming a lower half of the intake port 9, when section is taken along the flow of intake air. As shown by the centerline of the path of flow in FIG. 3(b), the straight part 13 inclines in a curved form from the side of the cylinder head 3 toward the combustion chamber 5, so that intake air flows almost directly into the combustion chamber 5 from above without accompanying strong turbulence. On the other hand, as shown by the centerline b of the path of flow in FIG. 3(b), the helical part 15 is composed of a helical chamber 15a formed around the intake valve 7 and a linear portion 15b tangentially connected to the helical chamber 15a, so that intake air flows tangentially from the linear portion 15b into the helical chamber 15a, and the intake air imparted with strong turbulence while flowing around the intake valve 7 flows in the form of a swirl into the combustion chamber 5.

The sectional shape of the intake port 9 will be described in more detail with reference to FIGS. 4(a), (b), (c), (d), (e), (f), (g), (h) and (i), by taking an axis Z (the central axis of the intake valve 7) and a surface Q(the lower surface of the cylinder head 3) shown in FIG. 3 as factors of references. By way of example, the inlet portion of the intake port 9 shown in FIG. 4(a) has a rectangular sectional area of about 30 mm×30 mm, and the straight part 13 and the linear portion 15b of the helical part 15 are disposed in the upper half and the lower half respectively of the sectional shape of the inlet portion of the intake port 9. At the area downstream of the inlet portion of the intake port 9, the straight part 13 and the helical chamber 15a and linear portion 15b of the helical part 15 are formed in the upper half and the lower half respectively of the sectional shape as shown in FIGS. 4(b) to 4(i) respectively and join at a position in the vicinity of the intake valve 7.

Next, a valve and a valve opening/closing mechanism for controlling flow of intake air into the intake port 9 will be described with reference to FIGS. 5 to 10.

Figure 5:
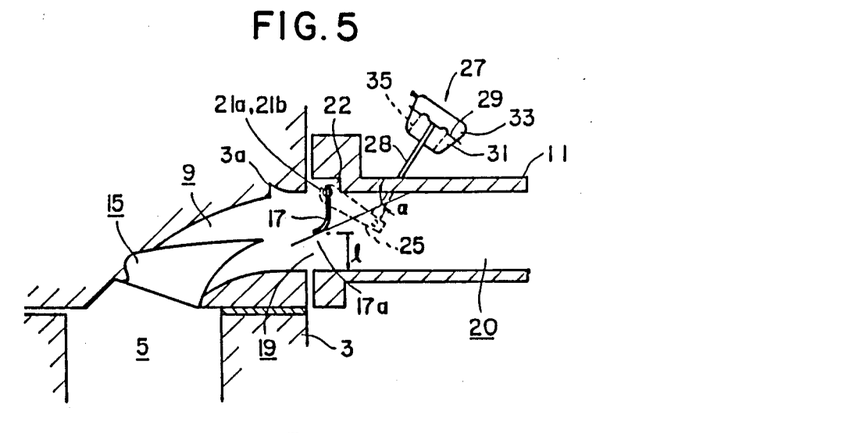
FIGS. 5, 6 and 7 illustrate a first embodiment of the present invention.

A valve 17 is disposed adjacent to the downstream end of the intake manifold 11 which is mounted to the cylinder head 3 to communicate with the intake port 9, so as to open and close an intake manifold passage 20 communicating with the intake port 9. This valve 17 is so shaped that, when full closed, it closes substantially the upper half only of the intake port 9 and defines or leaves a gap 19 in the lower half of the intake port 9. The height 1 of this gap is preferably, for example, about 5 to 15 mm or about ⅓ to 1/6 of the height of the intake manifold passage 20 or intake port 9. This value is selected to provide a swirl ratio of about 5 at which an improved combustion efficiency was experimentally observed when the engine was light-loaded, especially, when the engine was idling. The term "swirl ratio" is used herein to indicate the number of swirls induced in intake air supplied to the cylinder per suction stroke.

Figure 8:
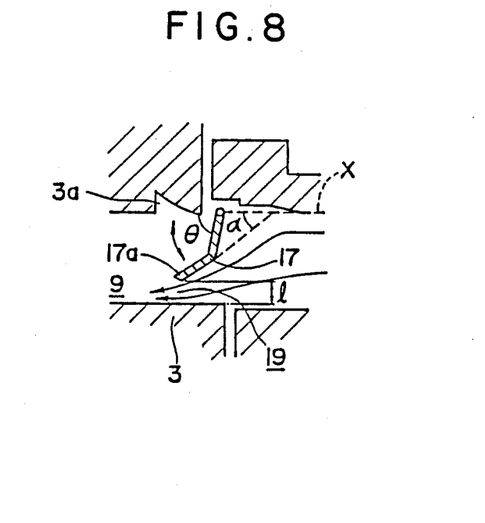
FIGS. 8, 9 and 10 illustrate the shape of various valves.

The valve 17 is rockably supported to open and close the intake port 9 as shown in FIG. 8, and its front end 17a inclines toward the downstream side Of the direction of intake air flow. When this valve 17 in inclined by an angle θ to be placed in its full closed position, its front end 17a makes an angle α(θα) with an axis X parallel to the flowing direction of intake air, with the result that the resistance against the flow of intake air is not increased. Thus, the inclination angle θ of the valve 17, when the height of the gap 19 is selected to be 1, can be made large, so that the length of the valve 17 need not be increased, and the shape of the intake port 9 is not limited.

Figure 9:
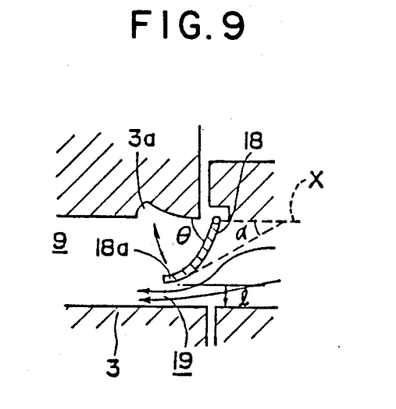

Another valve 18 shown in FIG. 9 is rockably supported to open and close the intake port 9, and its front end 18a is bent into an arcuate shape toward the downstream side of the direction of intake air flow. When this valve 18 is inclined by an angle θ to be placed in its full closed position, the angle α of a line tangential to the front end 18a relative to an axis X parallel to the flowing direction of intake air is smaller than θ, so that intake air can smoothly flow along the arc. Therefore, the inclination angle θ of the valve 18, when the height of the gap 19 is selected to be 1, can be made large, so that the length of the valve 18 need not be increased, and the shape of the intake port 9 is not limited.

Figure 10:
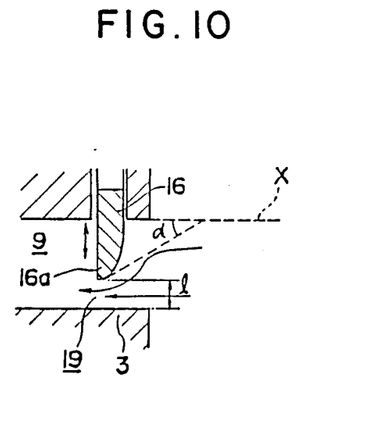

A valve 16 shown in FIG. 10 is supported so as to be inserted into and withdrawn from the intake port 9, and its front end 16a has an upstream-side surface formed into an arcuate shape inclining toward the downstream side of the direction of intake air flow. This swirl control valve 16 has an inclination of an angle α between a line tangential to its arcuate front end 16a and an axis X parallel to the flowing direction of intake air, so that the intake air is encountered with a small resistance against its flow.

In the embodiments described above, the angle α is preferably not larger than 30°. In FIGS. 8 and 9, the reference numeral 3a designates a groove for receiving the front end 17a and 18a of the valves 17 and 18 when the valves 17 and 18 are full opened.

In the arrangements shown in FIG. 8 and 9, the resistance against the flow of intake air can be reduced without increasing the total length of the valves 17 and 18. Also, in the arrangement shown in FIG. 10, the resistance against the flow of intake air can be reduced by the compact shape of the valve 16 which is not restricted by the shape of the intake port 9.

The shape of these valves is in no way limited to those shown in the embodiments described above, and various changes may be made therein without departing from the scope of the present invention.

As shown in FIG. 5, the helical port 15 for forming a swirl is provided in the intake port 9. Further, the valve 17 associated with the intake port 9 so as to interrupt straightforward flow of intake air toward and into the combustion chamber 5. This valve 17 is pivoted at its root end to an upper part of the intake port 9. This valve 17, which functions as a swirl-forming valve, operates within a range where the flow coefficient does not show any abrupt change, and its front end lies at a position adjacent to an extension of the inlet of the helical part 15 when the valve 17 is placed in the position interrupting straight forward flow of intake air. That is, in the illustrated embodiment, the length and mounting position of the valve 17 are determined to satisfy the two conditions described above.

The reason why the valve 17 is operated within the range where the flow coefficient does not show any abrupt change, will now be described. This is based on the fact that, when the inclination angle of the valve 17 with respect to the upper wall surface of the intake port 9 is selected to be larger than a predetermined value, it gives rise to an abrupt change in the flow coefficient resulting in a loss of fuel consumption. According to an experiment, the inclination angle giving rise to such an abrupt change is 30°. Therefore, the maximum inclination angle α of the front end 17a of the valve 17 is preferably smaller than 30° (more preferably smaller than 20°).

The valve 17 is opened and closed by a valve drive mechanism described later. This valve drive mechanism is driven by a control signal applied from a computer (described later) connected to various sensors including a vehicle speed sensor sensing the vehicle speed, an engine rotation speed sensor sensing the rotation speed of the engine, and a throttle opening sensor or an intake-manifold pressure sensor.

Figure 6:
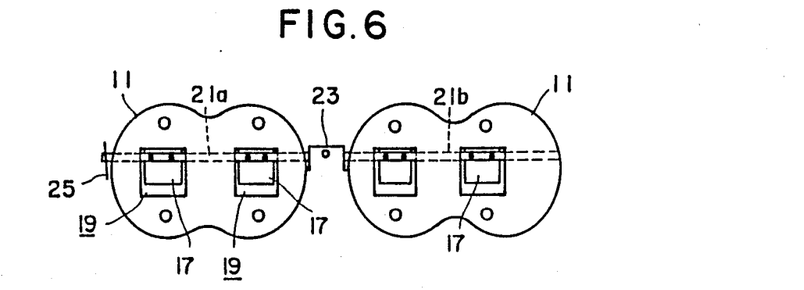

As shown in FIG. 6, the mechanism for opening and closing the valves 17 is constituted by shafts 21a, 21b, a lever 25 and a vacuum motor 27. The intake manifold 11 has the intake manifold passages 20 communicating with the intake ports 9 of a plurality of combustion chambers (four in FIG. 6) respectively. The shafts 21a and 21b are fixed to the upper end of the valves 17 disposed in the adjacent two intake manifold passages 20 respectively and extend through the intake manifold 11. These shafts 21a and 21b are connected to each other by a connecting member 23 at the center of the intake manifold 11, and the lever 25 is mounted on the free end of the shaft 21a. The joints between the shafts 21a, 21b and the valves 17 are located in a recess 22 formed at the downstream-side end face of the intake manifold 11. The vacuum motor 27 is divided into two chambers 31 and 33 by a diaphragm 29 to which an output rod 28 connected to the lever 25 is mounted. A return spring 35 having a tensile force is disposed in the chamber 31 of the vacuum motor 27 to connect the inner bottom face of the vacuum motor 27 to the diaphragm 29, and the other chamber 33 communicates with the intake manifold passages 20 so that a negative pressure in the intake manifold is supplied to this chamber 33.

The tensile actuating force of the return spring 35 is preferably such that the spring 35 urges the valves 17 to the full-open position when the intake-manifold negative pressure produced by opening/closing of the throttle valve (not shown) has a value of about −100 mmHg to −200 mmHg. Thus, when the intake-manifold negative pressure becomes low due to running of the vehicle under a heavy load, the valves 17 are opened by the spring force of the return spring 35.

Figure 7:
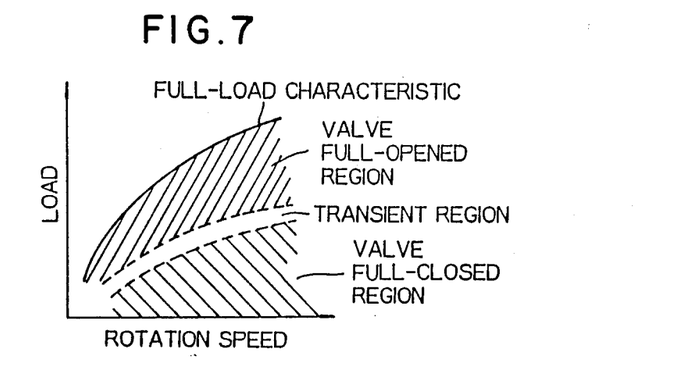

FIG. 7 shows the full-opened and full-closed regions of the valve 17, and there is a transient region showing a period of transition between the full-opened region and the full-closed region of the valve 17.

The operation of the valve drive mechanism having the above construction will now be described. When the engine is operating with a light load, the intake-manifold negative pressure is high, and such a negative pressure is supplied to the chamber 33 of the vacuum motor 27. The diaphragm 29 is urged upward against the tensile force of the return spring 35, and, together with the movement of the diaphragm 29, the output rod 28 is urged to hold the valves 17 in the closed position shown in FIG. 5 through the lever 25.

As a result, intake air to be introduced into each combustion chamber 5 flows through the gap 19 beneath the valve 17 and then flows along the lower half of the intake port 9, and a swirl is induced in the combustion chamber by the helical part 15 formed in the lower part of the intake port 9. The swirl ratio of the swirl induced at this time is selected to be about 5.

When, on the other hand, the engine is operating under a heavy load, the intake-manifold negative pressure is low. When the intake-manifold negative pressure becomes lower than a selected value between −100 mm Hg and −200 mm Hg, the force compressing the return spring 35 overcomes the intake-manifold negative pressure, and the diaphragm 29 is urged downward. With the downward movement of the diaphragm 29, the output rod 28 is actuated to start to open the valves 17 through the lever 25. According to the change in the intake-manifold negative pressure, the valves 17 are gradually opened until they are placed in the full-open position.

As a result, intake air to be introduced into each combustion chamber 5 flows along the upper straight part 13 and the lower helical part 15 of the intake port 9. Since the resistance against the flow of intake air is now small, a sufficient quantity of intake air flows into the combustion chamber, and the swirl ratio is reduced.

The effects of the aforementioned first embodiment will now be described. As described in detail with regard to the first embodiment of the intake port device according to the present invention, the intake port 9 is of the double structure consisting of the integral combination of the straight part 13 and the helical part 15, and the valve 17 opened and closed depending on the load of the engine is disposed adjacent to the inlet of the intake port 9. When the load of the engine is light, the valve 17 is full closed, and intake air to be introduced into the combustion chamber flows through the gap 19 beneath the valve 17 and then along the lower half of the intake port 9 and is turned into a swirl by the helical part 15 of the intake port 9. Therefore, mixing of intake air with fuel is promoted to improve the efficiency of combustion, thereby improving the fuel consumption and stabilizing the state of combustion during introduction of EGR or during combustion of a lean air-fuel mixture tending to give rise to unstable combustion. Also, when the valve 17 is full opened, a volumetric efficiency comparable to that obtained by the prior art straight port can be ensured, and the prior art defect such as the reduced output performance in the valve full-open position attributable to the reduced volumetric efficiency encountered with the prior art helical port can be compensated.

When the operation of the engine at an intermediate rotation speed or under an intermediate load is detected, the manner of control may, for example, be as follows. By way of example, the manner of control in such a case will be described with regard to a vehicle equipped with an engine of a four-valve DOHC(double overhead cam shaft) type. For the purpose of control, the valve 17 is opened, and the valve 17 associated with another intake port (not shown) functioning as a secondary intake port is closed by such a manner of control, intake air, which is appropriately regulated in its state of swirl and in its charging efficiency, can be supplied to the combustion chamber in an operation range intermediate between a low speed operation range and a high speed operation range of the engine. According to the intake port device arranged in the manner described above, the state of engine intake air can be appropriately controlled to greatly improve the engine output.

Figure 11:
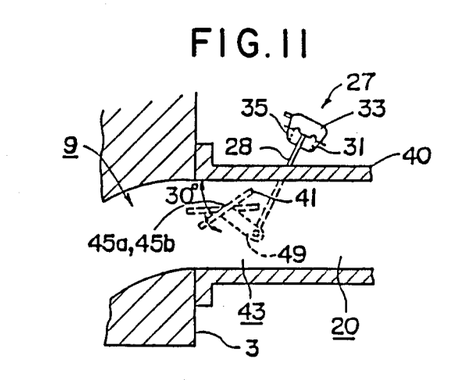
FIGS. 11 and 12 illustrate a second embodiment of the present invention.
Figure 12:
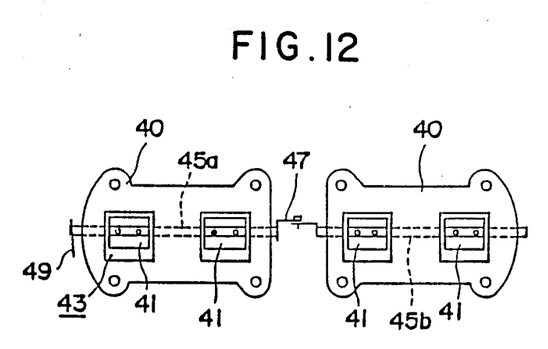

A second embodiment will now be described with reference to FIGS. 11 and 12. In FIGS. 11 and 12, the same reference numerals are used to designate the same parts as those employed in the first embodiment to dispense with explanation of such parts.

In FIGS. 11 and 12, the reference numeral 41 designates valves. The valves 41 are disposed adjacent to the downstream end of an intake manifold 40, so that each of them can open and close the intake manifold passage 20 and the intake port 9 associated therewith. The valve 41 is so shaped that, when full closed, it closes substantially the upper half only of the intake port 9 and defines or leaves a gap 43 therebeneath. As in the case of the first embodiment, this gap 43 has preferably a length of about 5 to 15 mm or its height is preferably about ½ to 1/6 of that of the intake manifold passage 20. As in the case of the first embodiment, shafts 45a, 45b, a lever 49 and a vacuum motor 27 constitute a mechanism for opening and closing the valves 41. The intake manifold 40 has the intake manifold passages 20 communicating with the intake ports 9 of a plurality of combustion chambers (four in FIG. 12) respectively, as in the case of the first embodiment. The shafts 45a and 45b are fixed to an about vertically middle part of the valves 41 disposed in the adjacent two intake manifold passages 20 respectively and extend through the intake manifold 40.

These shafts 45a and 45b are connected to each other by a connecting member 47 at the center of the intake manifold 40, and the lever 49 is mounted on the free end of the shaft 45a. The output rod 28 of the vacuum motor 27 is connected to the lever 49.

The operation and functional effects of the second embodiment having the above construction are the same as those of the first embodiment. In the second embodiment, the shafts 45a and 45b supporting the valves 41 extend through the intake manifold passages 20. Therefore, the recess 22 formed at the disposed position of the shafts 21a and 21b in the first embodiment is unnecessary, so that the intake manifold can be easily machined and simply manufactured.

A third embodiment will next be described with reference to FIGS. 13(a) and 13(b). The same reference numerals are used to designate the same parts employed in the first embodiment to dispense with explanation of such parts.

Figure 13A:
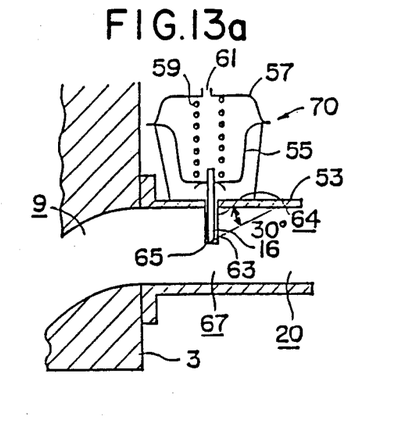
FIGS. 13(a) and (b) illustrate a third embodiment of the present invention.
Figure 13B:
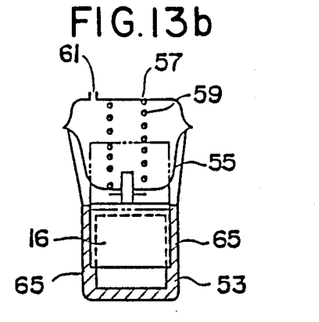

In FIGS. 13(a) and 13(b), the reference numeral 16 designates the valve shown in FIG. 10. This valve 16 is mounted so as to be vertically slidable in an intake manifold passage 20 of an intake manifold 53 mounted on the cylinder head 3.

The reference numeral 70 designates an opening/closing mechanism controlling opening and closing of the valve 16. A diaphragm 55 is connected to the upper end of the valve 16 and partitions a casing 57. A spring 59 having a tensile force connects the diaphragm 55 to an upper inner surface of the casing 57. A communication opening 61 formed in the upper wall of the casing 57 permits communication of the upper chamber of the casing 57 partitioned by the diaphragm 55 with the atmosphere. A vertical guide channel 63 is formed in the intake manifold passage 20. The valve 16 makes its vertical sliding movement in this guide channel 63, and the intake manifold passage 20 communicates with the lower chamber of the casing 57 partitioned by the diaphragm 55, through a gap 64 between the guide channel 63 and the valve 16. A stopper 65 is formed at the lower end of the guide channel 63 to define the position of the lower end of the sliding movement of the valve 16.

In the full-closed position where the valve 16 is moved to the lower end of its sliding movement, a gap 67 is left beneath the valve 16 to permit communication with the lower half of the intake port 9. The length of this gap 67 is preferably about 5 to 15 mm or the height of the gap 67 is preferably about ½ to 1/6 of that of the intake manifold passage 20, as in the case of the first embodiment.

According to the structure of the third embodiment described above, the negative pressure in the intake manifold 53, hence, the negative pressure in the lower chamber of the casing 57 partitioned by the diaphragm 55 increases when the load of the engine is light, and the diaphragm 55 is urged downward against the tensile force of the spring 59. As a result, the valve 16 is brought to its closed position, thereby inducing a swirl in the combustion chamber. On the other hand, when the load of the engine is heavy, the internal pressure of the intake manifold 53 is close to the atmospheric pressure, and the valve 16 is urged upward by the force of the spring 59 and is finally full opened thereby limiting induction of the swirl.

Figure 14A:
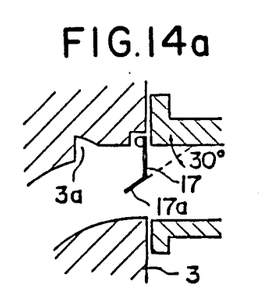
FIGS. 14(a) and (b) illustrate modifications of the first embodiment and second embodiment respectively.
Figure 14B:
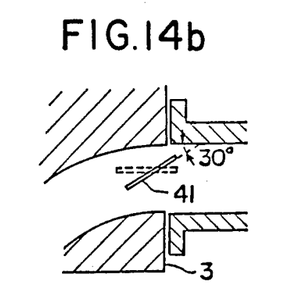

In the valve structures described in the aforementioned first, second and third embodiments, the valve 17 in the first embodiment and the valve 41 in the second embodiment may be disposed on the side of the cylinder head 3 as shown in FIGS. 14(a) and 14(b) in lieu of being disposed adjacent to the downstream end of the intake manifold. Even when the valves 17 and 41 are disposed at such a position, the functional effects similar to those described above are exhibited.

Modifications of the valve opening/closing mechanism will now be described. First, a modification of the vacuum motor 27 constituting the opening/closing mechanism for the valve 17 in the first embodiment will be described with reference to FIGS. 15 and 16, as a fourth embodiment.

Figure 15:
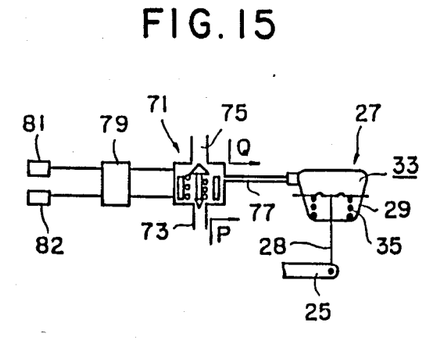
FIGS. 15 and 16 illustrate a fourth embodiment of the present invention showing another form of the opening/closing mechanism employed in the first embodiment.
Figure 16:
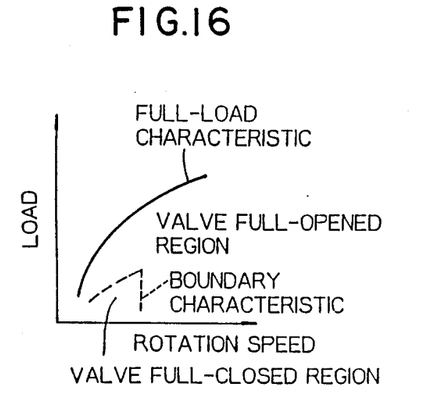

The arrangement is the same as that described in the first embodiment except that the intake-manifold negative pressure supplied to the vacuum motor 27 is controlled depending on the rotation speed and load of the engine. Therefore, the same reference numerals are used to designate the same parts to dispense with explanation of such parts.

In FIG. 15, the reference numeral 71 designates a solenoid valve which comprises a port 73 communicating with the intake manifold passage 20, a port 75 communicating with the atmosphere, and a port 77 communicating with the chamber 33 of the vacuum motor 27. The solenoid valve 71 is a three-way solenoid valve which changes over the route of communication between the ports 73 and 77 (indicated by the arrow P in FIG. 15) and communication between the ports 73 and 75 (indicated by the arrow Q in FIG. 15) under control of a signal applied from a computer 79. An output signal from an engine load sensor, that is, a throttle opening sensor 81 and an output signal from an engine rotation speed sensor 82 are applied to the computer 79, and, in response to those signals, the computer 79 applies an actuation signal to the solenoid valve 71.

The computer 79 controls to full open and full close the valve 17 according to a characteristic as, for example, shown in FIG. 16, so that the valve 17 is full closed only when the load of the engine is light and the engine rotation speed is low, but is full opened in a high rotation speed range. In this case, the valve 17 is full opened in the high rotation speed range, because, in a range where the load is light and the rotation speed is high, the fuel consumption is not greatly influenced, and importation of a swirl to intake air is not especially necessary.

The spring force of the return spring 35 in the vacuum motor 27 is so selected that the diaphragm 29 is necessarily urged by the intake-manifold negative pressure to full close the valve 17 in the full-closed region in the characteristic diagram shown in FIG. 16.

The operation of the mechanism will now be described. When the actuation signal is applied to the solenoid valve 71 from the computer 79, the port 73 communicates with the port 77 to supply the intake-manifold negative pressure to the chamber 33 of the vacuum motor 27, and the diaphragm 29 is urged against the force of the return spring 35 thereby maintaining the valve 17 in its full-closed position. On the other hand, when the operating condition of the engine lies in the valve full-opened region in the characteristic diagram shown in FIG. 16, the actuation signal to the solenoid valve 71 from the computer 79 is turned off. The chamber 33 of the vacuum motor 27 is now opened to the atmosphere, and the valve 17 is full opened by the force of the return spring 35. In the manner described above, the valve 17 is alternatively controlled to be placed in one of the full-opened position and the full-closed position depending on the load and rotation speed of the engine.

According to the fourth embodiment, the opening and closing of the valve 17 is controlled depending on the load and rotation speed of the engine. Therefore, an adequately controlled swirl corresponding to the operating condition of the engine is imparted to intake air to improve the fuel consumption and output performance over the first embodiment in which the opening and closing of the valve is controlled depending on the load only. Also, when the idling state of the engine is judged on the basis of the rotation speed signal and load signal, and the valve 17 is full closed during the idling mode only, the fuel consumption in the idling mode can be improved.

The valve opening/closing mechanism described above is similarly applicable to the valve 41 in the second embodiment thereby achieving similar effects.

Figure 17:
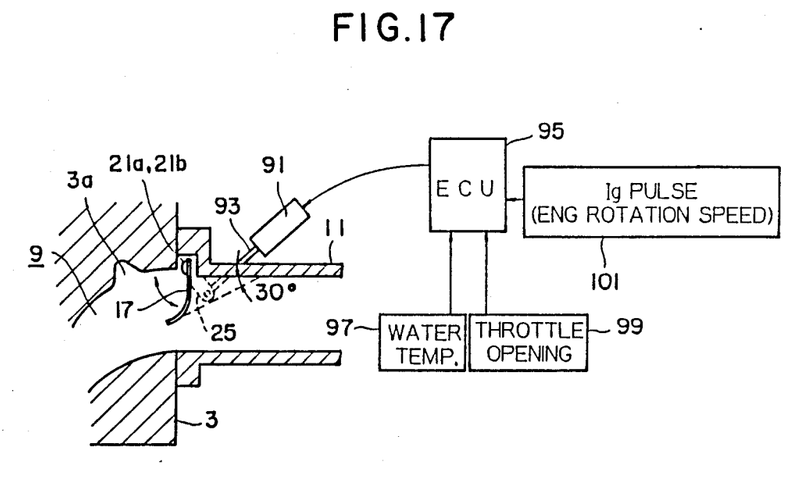

A fifth embodiment in which, in lieu of the vacuum motor 27 constituting the opening/closing mechanism for the valve 17 in the first embodiment, a stepping motor 91 is provided to continuously control the opening/closing of the valve 17, will be described with reference to FIG. 17 and FIGS. 18(a), (b), (c) and (d). The same reference numerals are used to designate the same parts employed in the first embodiment to dispense with explanation of such parts.

An output shaft 93 of the stepping motor 91 is connected to the lever 25, and an advancing stroke of the output shaft 93 is controlled by a computer 95. An output signal from a water temperature sensor 97, an output signal from a throttle opening sensor 81 and an output signal from an engine rotation speed sensor 82 are applied to the computer 95 and, on the basis of those signals, the computer 95 applies an actuation signal to the stepping motor 91. For example, the valve 17 is full closed when the engine is idling, 45° opened when the vehicle runs at 40 Km/hr, and full opened when the engine is full loaded.

Figures 18A, 18B:
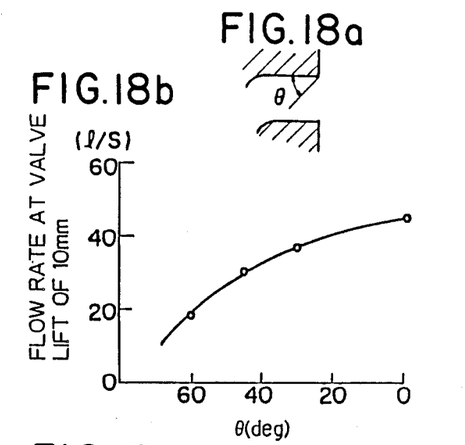
Figure 18C:
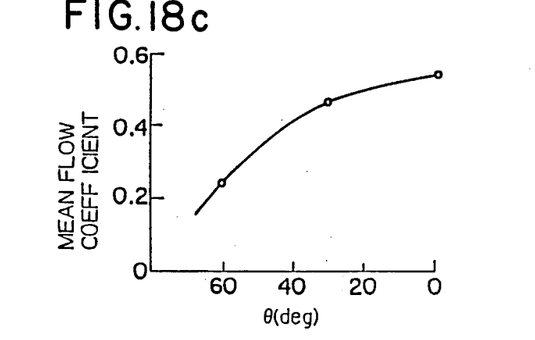
Figure 18D:
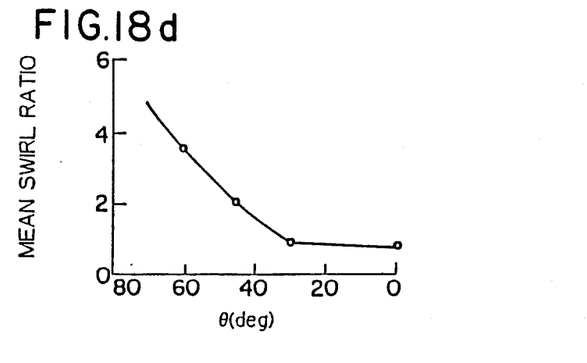
Figure 19A:
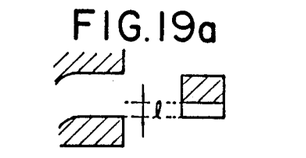
Figure 19B:
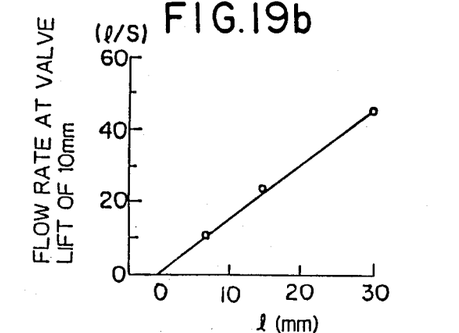
Figure 19C:
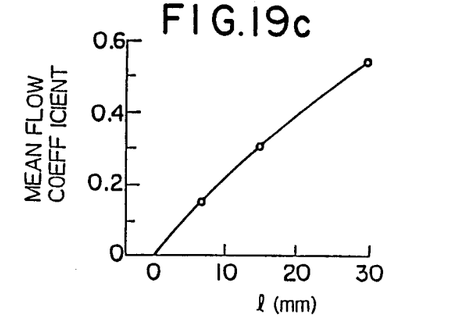
Figure 19D:
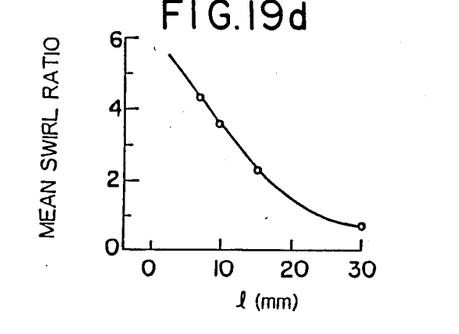

FIGS. 18(a), (b), (c) and (d) show experimentally observed data of the flow of intake air from one of intake ports 9 to the associated combustion chamber 5. That is, there are shown a mean swirl ratio FIG. 18(d)), a mean flow coefficient (FIG. 18(c)), and a flow rate (1/s) at a 10-mm lifted valve position FIG. 18(b)) when the valve 17 is closed by an angle $\theta°$ in the closing direction from its full-opened position. When, for example, the angle changes from 0° to 60°, the mean swirl ratio changes from 1 to about 3.5. The computer 95 judges the operating condition of the engine from the data shown in FIG. 18 and, on the basis of those data, generates and applies the actuation signal to the stepping motor 91, so that the opening $\theta$ of the valve 17 is selected to provide an optimum condition of intake air supplied to the engine thereby controlling the operation of the engine under the optimum intake-air condition.

Therefore, the opening/closing control of the valve, which is more appropriate for determining the operating condition of the engine than the alternative selection of the full-opened position and the full-closed position of the valve 17, is continuously carried out thereby effectively improving the fuel consumption and improving the output performance.

The structure of the fifth embodiment can also be applied to the valves in the second and third embodiments thereby attaining similar effects. FIG. 19 shows a mean swirl ratio (FIG. 19(d)), a mean flow coefficient (FIG. 19(c)) and a flow rate (1/s) at a 10-mm lifted valve position (FIG. 19(b)), relative to displacement of the valve 16 when the fifth embodiment is applied to the operation of the valve 16 employed in the third embodiment. Thus, the optimum amount of opening of the valve 16 can be continuously controlled according to the operating condition of the engine.

A sixth embodiment in which the opening/closing mechanism for the valve 17 differs from that employed in the first embodiment, will be described with reference to FIGS. 20, 21 and 22. The same reference numerals are used to designate the same parts employed in the first embodiment to dispense with explanation of such parts.

Figure 20:
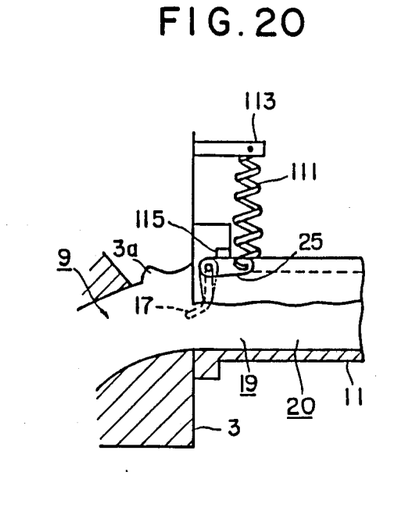
FIGS. 20, 21 and 22 illustrate a sixth embodiment of the present invention showing another form of the opening/closing mechanism employed in the first embodiment.
Figure 21:
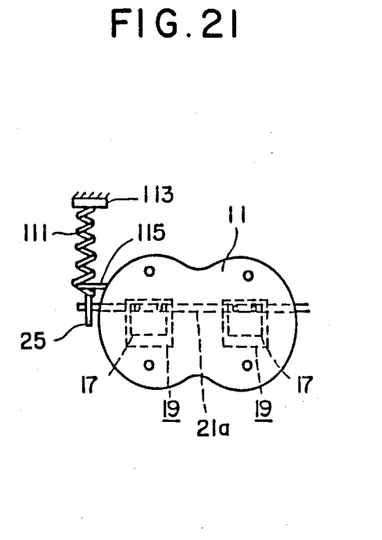

In FIGS. 20 and 21, the reference numeral 111 designates a spring which is supported at one end thereof by a supporting member 113 fixed to the cylinder head 3 and which is connected at the other end thereof to the lever 25 to normally pull the lever 25. A stopper 115 is member fixed to the intake manifold 11, and the lever 25 engages the stopper 115 to position the valve 17 in the full-closed position.

Figure 22:
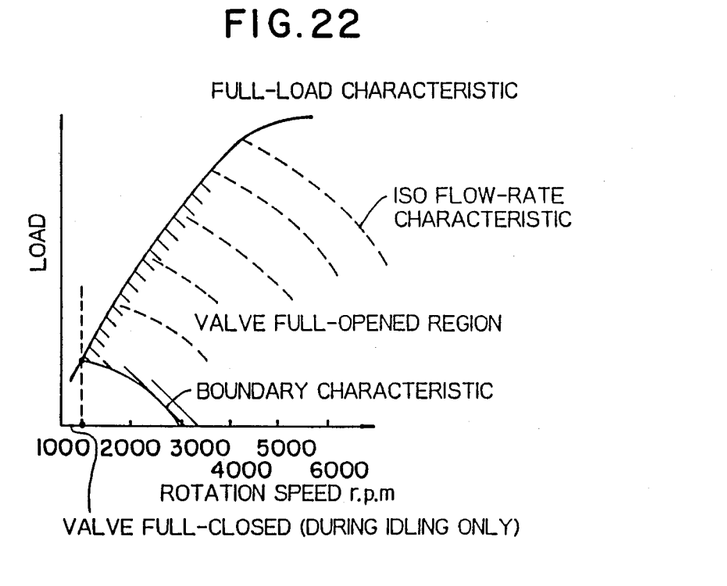

The tensile force of the spring 111 is selected so that the valve 17 is controlled according to a characteristic as shown in FIG. 22. That is, the force of the spring 111 is set so that the valve 17 is full closed when the engine is idling, and full opened by the flow of intake air when the engine is rotating at 1,000 r.p.m. under the full load.

The operation of the sixth embodiment will now be described. When the engine is idling, the valve 17 is pulled by the force of the spring 111, and the lever 25 is engaged by the stopper 115 to maintain the valve 17 in the full-closed position. With the increase in the rotation speed and load of the engine, the flow rate of intake air increases to increase the pressure imparted to the valve 17 by the flow of intake air. The valve 17 is opened by an amount corresponding to the flow rate of intake air and is placed in its full-opened position when the relation between the load and the rotation speed of the engine reaches a boundary characteristic curve shown in FIG. 22, that is, a curve determined by the intake air flow-rate characteristic at 1,000 r.p.m. under the full load.

Therefore, the state of the valve 17 can be automatically and continuously changed from the full-closed position to the full-opened position by the pressure imparted by the flow of intake air supplied to the engine. The flow rate of intake air which urges the valve 17 to its full-opened position can be freely set by freely setting the biasing force of the spring 111, so that effects similar to those of the first embodiment can be exhibited.

According to the present invention, an intake port is formed by an integral combination of a straight part and a helical part, and a valve is disposed at an upper position adjacent to the inlet of the intake port. The opening of this valve is suitably controlled so that, when the engine is light-loaded, the flow rate of intake air flowing into the helical part of the intake port is increased to induce a swirl in the intake air flowing into the combustion chamber, thereby improving the efficiency of combustion, while when the engine is heavy-loaded, the flow rate of intake air flowing into the combustion chamber is secured by both the straight part and the helical part, thereby compensating the reduction of the performance. Further, the intake port is formed into a special one-piece shape without provision of any partition wall or the like, thereby facilitating the manufacture of the intake port and reducing the cost of the intake port.

We claim:

1. An intake port device comprising an intake port providing a passage of intake air flowing into a combustion chamber of a cylinder of an internal combustion engine, said intake port including a straight part forming an upper half of said intake port with respect to the axial direction of the cylinder and a helical part formed integrally with said straight part without provision of any partition wall therebetween to form a lower half of said intake port with respect to the axial direction of the cylinder, said helical part having a swirl chamber of helical configuration surrounding an intake valve, value means disposed adjacent to the inlet of said intake port to open and close the sectional area of the passage in said intake port, said valve means, when urged to its closed position, being held in the closed position without causing any sharp decrease in the coefficient of intake air flow, and an opening/closing mechanism for controlling opening and closing of said valve means according to the load of the engine.

2. An intake port device comprising an intake port providing a passage of intake air flowing into a combustion chamber of a cylinder of an internal combustion engine, said intake port including a straight part forming an upper half of said intake port with respect to the axis direction of the cylinder and a helical part formed integrally with said straight part without provision of any partition wall therebetween to form a lower half of said intake port with respect to the axial direction of the cylinder, said helical part having a swirl chamber of helical configuration surrounding an intake valve, valve means disposed adjacent to the inlet of said intake port to open and close the sectional area of the passage in said intake port, said valve means having a free end terminating to maintain a predetermined gap between the free end and the lower wall of said intake port even when said valve means is maintained in the closed position, said free end being at least partly bent toward the downstream direction of the flow of intake air flowing into the cylinder from the upstream side, and an opening/closing mechanism for controlling opening and closing of said valve means according to the load of the engine.

3. The intake port device of claim 2, in which said valve means is pivoted for rotation about an upper edge thereof with respect to the cylinder axis.

4. The intake port device of claim 2, in which said valve means is pivoted for rotation at a position intermediate upper and lower edges thereof.

5. The intake port device of claim 2, in which said valve means is slidably mounted for vertical movement.

6. The intake port device according to claim 2, in which said opening/closing mechanism is operative to move said valve means of a multiple cylinder internal combustion engine in unison with each other thus to provide a variable intake-swirl producing mechanism in combination with respective said passages and swirl chambers of the respective cylinders.

7. The intake port device according to claim 2, in which said opening/closing mechanism is a vacuum motor operates by negative pressure existing in an intake manifold of said engine, thus to provide a variable intake-swirl producing mechanism in combination with respective said passages and swirl chambers of the respective cylinders.

8. The intake port device according to claim 7, in which said supply of negative pressure to said vacuum motor is controlled in accordance with the speed of the engine and the load imposed upon said engine.

9. The intake port device according to claim 2, in which, when said valve means is closed, said free end of said valve means is brought to a position where at least a lower half of the sectional area of the passage in said intake port, which lower half is separated from an upper half by an imaginary plane corresponding to an upstream extension of the lower wall of said helical part, is left open to permit flow of intake air therethrough.

10. The intake port device according to claim 2, in which said free end of said valve means is bent at an angle of about 30° with respect to the downstream direction of the flow of intake air.

11. The intake port device according to claim 2, in which said opening/closing mechanism is a stepping motor.

12. The intake port device according to claim 11, in which said stepping motor is controlled in dependence on the rotational speed, the throttle opening, and the water temperature of said engine.

13. The intake port device according to claim 2, in which said opening/closing mechanism is a tension spring acting in opposition to forces exerted on said valve means by air flow past said valve means.

14. The intake port device according to claim 13, in which said spring has a rate permitting said valve means to move from a first to a second position at all times when said engine is operating under fuel load and at speed in excess of one thousand rpm.

15. The intake port device of claim 5, in which said opening/closing mechanism is diaphragm motor incorporating a compression spring which maintains said valve means in a second position under heavy loading of said engine, and which progressively moved said valve means against the bias of said spring toward a first position as the load on said engine decreases.

* * * * *